(12) United States Patent  
Kim

(10) Patent No.: US 6,304,431 B1  
(45) Date of Patent: Oct. 16, 2001

(54) PORTABLE COMPUTER SYSTEM HAVING ERGONOMIC KEYBOARD AND DETACHABLE DISPLAY UNIT

(75) Inventor: Myung-Jung Kim, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/148,903

(22) Filed: Sep. 8, 1998

(30) Foreign Application Priority Data

Oct. 7, 1997 (KR) .................................................. 97-27737

(51) Int. Cl.[7] ................................. G06F 1/16; H05K 5/02
(52) U.S. Cl. ............................................. 361/680; 361/681
(58) Field of Search .................................. 361/681, 682, 361/686, 683, 680; 312/223.1; 345/149, 156; 248/918, 921–923; 400/488, 489, 472

(56) References Cited

U.S. PATENT DOCUMENTS

| | | | |
|---|---|---|---|
| 5,196,993 | * | 3/1993 | Herron et al. ........................ 361/681 |
| 5,198,991 | * | 3/1993 | Pollitt ................................... 364/708 |
| 5,247,285 | * | 9/1993 | Yokota et al. ........................ 345/169 |
| 5,469,194 | * | 11/1995 | Clark et al. ........................... 345/173 |
| 5,613,786 | * | 3/1997 | Howell et al. ........................ 400/489 |
| 5,646,818 | * | 7/1997 | Hahn .................................... 361/681 |
| 5,689,253 | * | 11/1997 | Hargreaves et al. .................... 341/22 |
| 5,717,431 | * | 2/1998 | Chia-Ying et al. ................... 345/168 |
| 5,729,429 | * | 3/1998 | Margaritis et al. ................... 361/680 |
| 5,805,415 | * | 9/1998 | Tran et al. ............................ 361/681 |
| 5,841,635 | * | 11/1998 | Sadler et al. ......................... 361/749 |
| 6,006,243 | * | 12/1999 | Karidis ................................. 708/100 |

* cited by examiner

Primary Examiner—Lynn D. Feild  
(74) Attorney, Agent, or Firm—Robert E. Bushnell, Esq.

(57) ABSTRACT

A portable computer system enables a comfortable (more ergonomic) user environment without surrendering portability. The portable computer system includes a main body, a keyboard unit, and a display unit. The keyboard unit is attached to an upper surface of the main body and is structurally and operationally separated along a central axis into a left keyboard half and a right keyboard half, with the respective halves rotating on first and second hinges and being coupled to the main body at a rearward upper surface thereof. The display unit is mounted via a hinge unit to a rear side surface of the main body and is slidably detachable therefrom via a recess for receiving a portion of the hinge unit.

20 Claims, 4 Drawing Sheets

PORTABLE COMPUTER SYSTEM HAVING ERGONOMIC KEYBOARD AND DETACHABLE DISPLAY UNIT

CLAIM OF PRIORITY

This application makes reference to, incorporates the same herein, and claims all benefits accruing under 35 U.S.C. §119 from my application entitled Portable Computer Mounted Keyboard and Display Unit to Split filed with the Korean Industrial Property Office on Oct. 7, 1997 and there duly assigned Serial No. U97-27737 by that Office.

BACKGROUND OF THE INVENTION

1. Field of the Invention

The present invention relates to portable computers and, more particularly, to a portable computer system having a display unit designed to be detachable or unified with the computer's main body and a portable computer system having an ergonomic keyboard capable of being split into halves corresponding to the left and right hands of a user.

2. Discussion of Related Art

Generally speaking, personal computers can be classified as those intended for desktop usage and those which are portable, e.g., laptops and notebooks. Since a desktop computer is intended to be used at a fixed place, its typical state of usage is one where a main body, display unit and keyboard are detached from one another, with the display unit and keyboard being of a size and of a configuration (relative placement) favorable for adult usage. That is, the physical size (height) of the typical user stipulates the standard size—particularly, width dimensions—of a keyboard for use with a desktop computer, and most users find that a display device for use with a desktop computer is comfortably situated when positioned some distance back from (behind) the keyboard. The inherent design of a portable computer system, on the other hand, requires a smaller keyboard and a display device of a very close proximity thereto.

To compensate, a standard-sized (or ergonomically improved) keyboard and a remote monitor can be connected to the portable computer in an auxiliary fashion. Doing so, however, defeats the very purpose of a portable computer, by removing its portability and thus transforming the portable system into a virtual desktop system. Therefore, an improved computer system, i.e., one or having a keyboard and/or display device which can be used conveniently within a limited area while maintaining portability, is needed.

SUMMARY OF THE INVENTION

Accordingly, in order to overcome such drawbacks in the conventional art, it is therefore an object of the present invention to provide a portable computer system with a comfortable (ergonomic) user environment that can be created without surrendering portability.

It is another object of the present invention to provide a portable computer system having an integral keyboard that provides a typical adult user with a wider typing area.

It is still another object of the present invention to provide a portable computer system having a detachable display device for usage (viewing) at a comfortable distance behind the computer's main body.

To achieve these and other advantages and in accordance with the purpose of the present invention, as embodied and broadly described, there is provided a portable computer system having: a main body for controlling the portable computer system; a keyboard unit, attached to an upper surface of the main body, for controlling the main body, the keyboard unit being structurally and operationally separated along a central axis into a left keyboard half and a right keyboard half, the respective halves rotating on first and second hinges and being coupled to the main body at a rearward upper surface thereof, and a display unit, mounted via a hinge unit to a rear surface of the main body, for displaying images in accordance with a control signal generated by the main body.

According to another aspect of the present invention, there is also provided a portable computer system having: a main body for controlling the portable computer system; a keyboard unit, attached to an upper surface of the main body, for controlling the main body; and a display unit, mounted via a hinge unit to a rear side surface of the main body, for displaying images in accordance with a control signal generated by the main body, the display unit being slidably detachable from the main body via a recess formed in the rear side surface of the main body for receiving a portion of the hinge unit.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
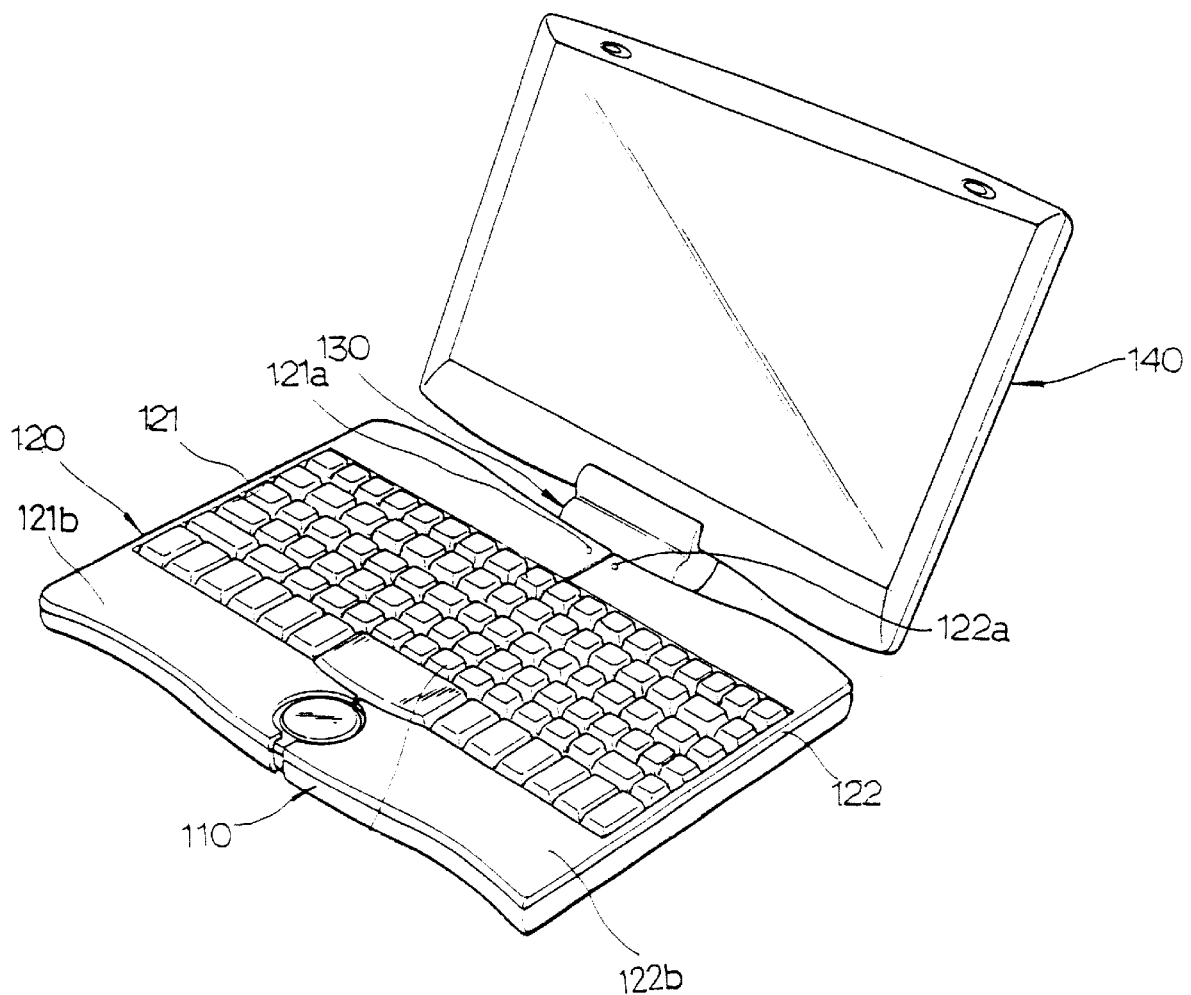
FIG. 1 is a perspective view of a portable computer system according to the present invention.
Figure 2:
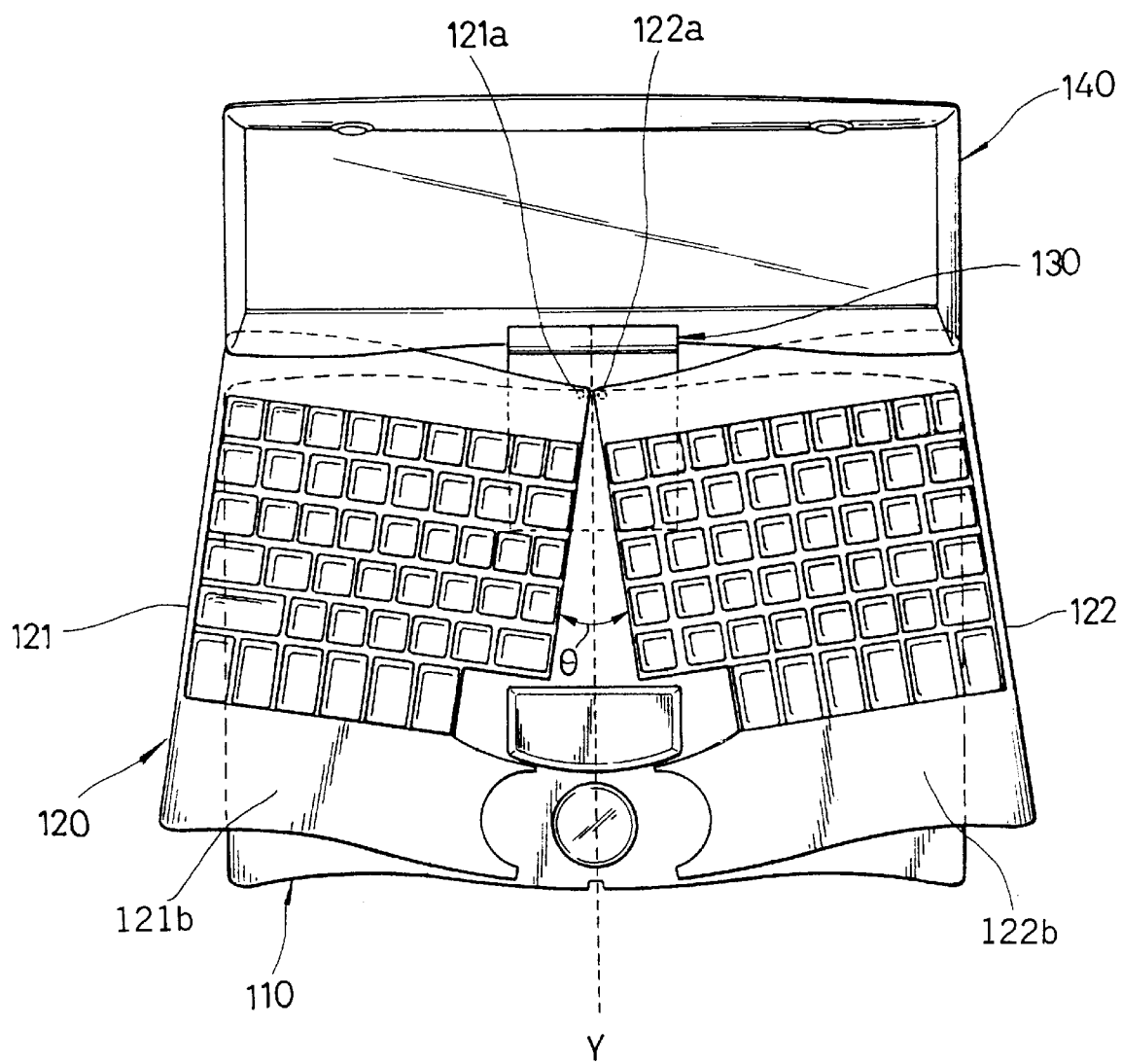
FIG. 2 is a plan view of the portable computer system of FIG. 1, showing the use of a keyboard adopting the principles of the present invention.

As shown in FIGS. 1 and 2, a portable computer system according to the present invention has: a main body 110 for controlling the entire system and corresponding to the main body of a desktop computer system; a keyboard unit 120 that is separated, both structurally and operationally, along a central axis Y thereof into a left keyboard half 121 and a right keyboard half 122, with the respective halves rotating on first and second hinges 121a and 122a and each half being coupled to the main body at the rearward upper surface thereof; a display unit 140 which is a flat-panel display device and typically uses thin-film transistor, plasma or liquid crystal technology; and a hinge unit 130, combined with the display unit, for establishing an angle of rotation of the display unit with respect to the main body. Further, in the embodiment of the present invention, the keyboard unit 120 includes a palm rest portion that, along with the keyboard unit's separating rotation, can be separated into left and right palm rests 121b and 122b.

As in any such portable computer system in which transport is carried out while the display is folded over the keyboard, in order to operate the keyboard unit 120, the display unit 140 is first rotated into an upright or angled position according to the user's preference. At this time, the two halves of the keyboard unit 120 can be separated from each other by applying a shearing force to the left keyboard half 121 or to the right keyboard half 122, in order to create a more ergonomic typing environment. That is, by way of a symmetrically operative gearing mechanism (not shown) located in the main body 110, a leftward force on the left keyboard half 121, which is sufficient to displace the keyboard unit 120 with respect to the top surface of the main body, causes an equal and opposite movement of the right keyboard half 122, and vice versa. Accordingly, a predetermined angle θ between the opposing halves of the keyboard unit 120 is achieved in accordance with ergonomic design criteria.

Figure 3:
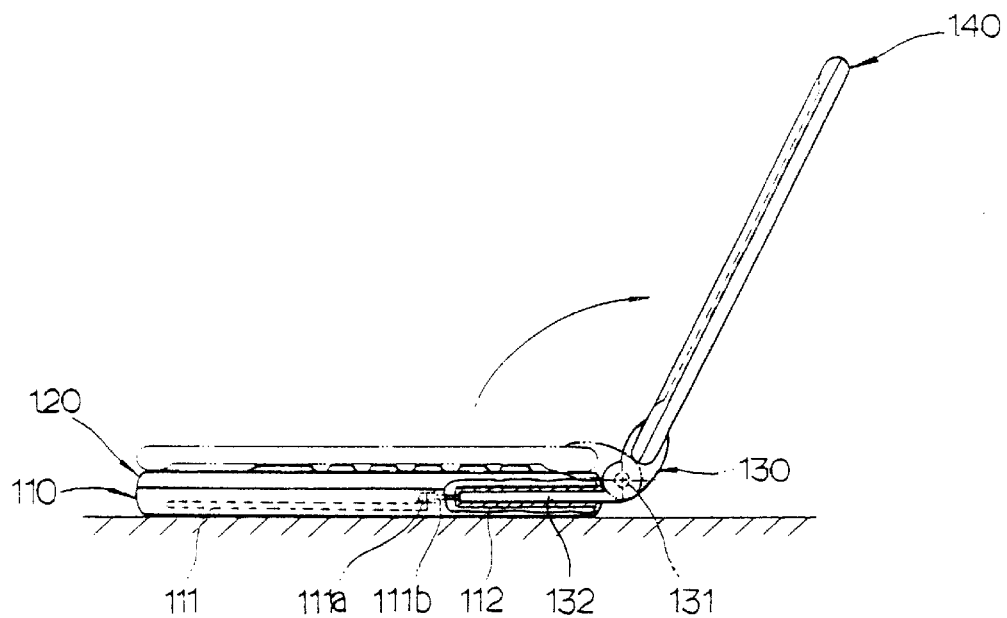
FIGS. 3 and 4 are side views of the portable computer system of FIG. 1, showing the attached and detached states, respectively, of a display unit adopting the principles of the present invention.

As shown in FIG. 3, the main body 110 has a recess 112 formed on the rear side surface thereof, for receiving a display support 132 of the hinge unit 130; and a main circuit board 111 having a connection terminal 111a for connection with a communicating cable 111b and thus establishing electrical communication between the main body and the display unit 140. The communicating cable 111b, being connected to the connection terminal 111a, passes through a rear wall of the recess 112 and travels through the interior of the display support 132 of the hinge unit 130, for ultimate connection with a circuit board (not shown) of the display unit 140. While the display unit 140 remains attached (mounted) to the main body 110, the excess length of the communicating cable 111b is stored within the recess 112.

Figure 4:
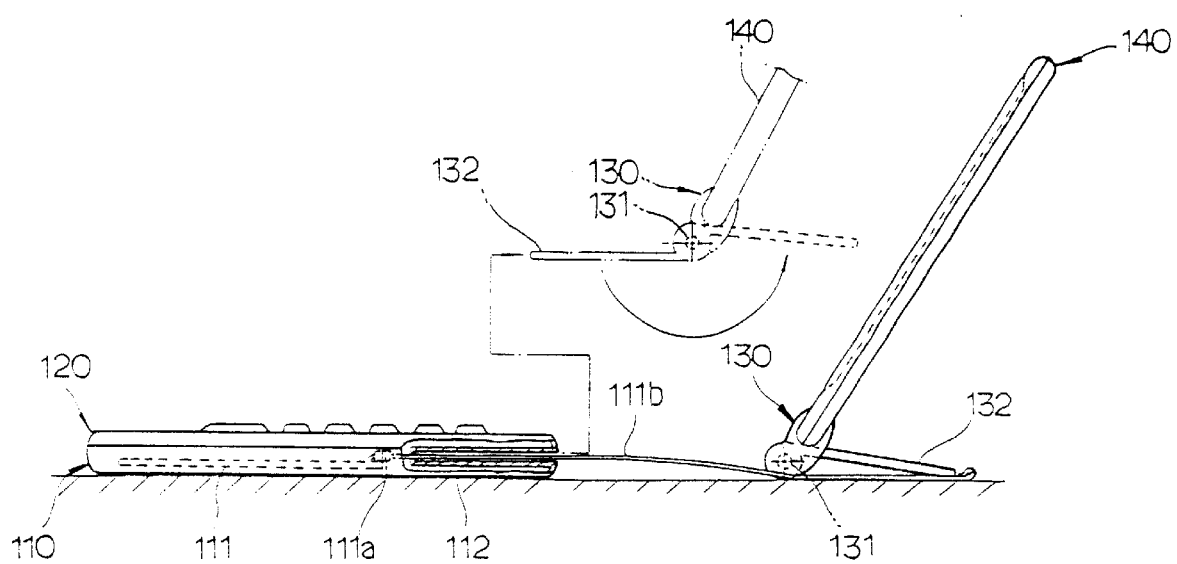

In detaching the display unit 140 from the main body 110, as shown in FIG. 4, the display support 132 of the hinge unit 130 is pulled (slid) from the recess 112. This action also draws out a length of the communicating cable 111b. Then, the display support 132 is swung about a hinge axis 131 into a rearward position, to serve as a base for supporting the display unit 140 on a level surface. Besides providing a sufficient base while the display unit 140 is detached from the main body 110, it should be appreciated that the length of the display support 132 is such that proper support of the display unit is provided while mounted to the main body.

Figure 5:
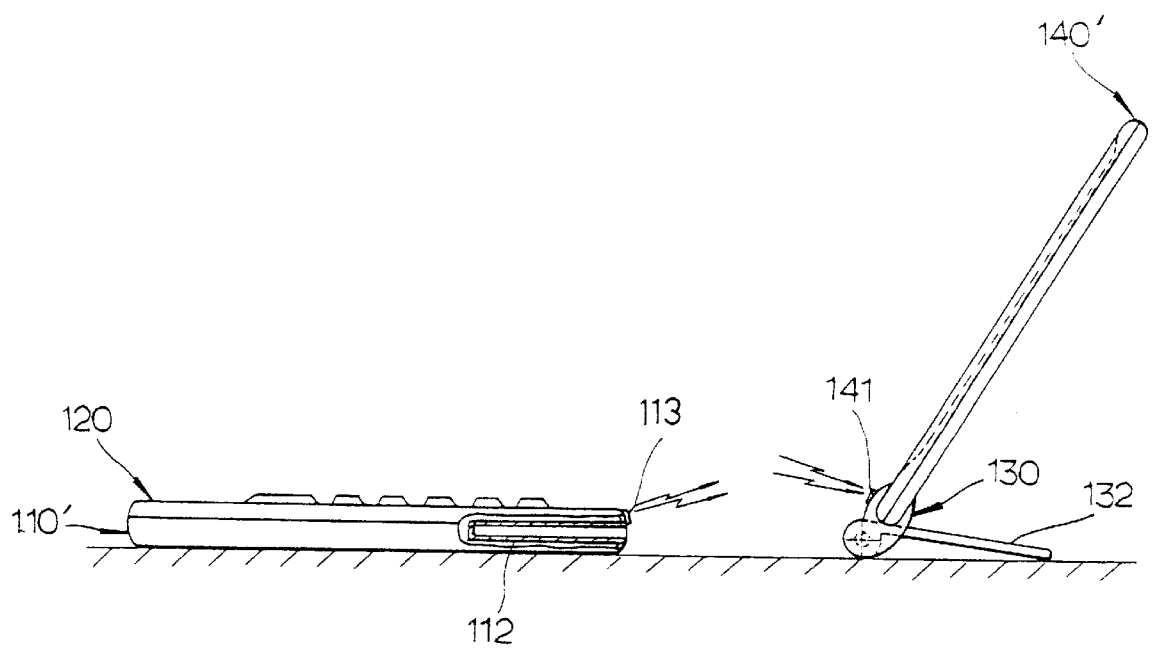
FIG. 5 is a side view of the detachable display unit of a portable computer system, according to another embodiment of the present invention.

FIG. 5 illustrates another embodiment of the detachment of a display unit 140' from a main body 110' whereby electrical communication with the display unit is wireless, a light-emitting device 113, which communicates electrically with the main circuit board 111, is mounted on the rear of the main body and directed toward the display unit, while a light-receiving device 141 is mounted on the front of the display unit and directed toward the main body. Accordingly, the communicating cable 111b is rendered unnecessary and the relative placement of the separated components of the portable computer system is less restricted. Furthermore, in such a configuration, the recess 112 and hinge unit 130 can be simplified in that the through holes for routing the communicating cable 111b are not required.

As described above, by utilizing the portable computer system of the present invention, a comfortable user environment is provided without surrendering portability. That is, when separated, the hinged halves of the keyboard unit provide a typical adult user with a wider, more ergonomic typing area and the detachable display unit enables viewing at a comfortable distance behind the computer's main body.

It will be apparent to those skilled in the art that various modifications can be made in the portable computer system having an ergonomic keyboard and a detachable display unit of the present invention, without departing from the spirit of the invention. Thus, it is intended that the present invention cover such modifications as well as variations thereof, within the scope of the appended claims and their equivalents.

What is claimed is:

1. A portable computer system comprising:
   a main body controlling said portable computer system;
   a keyboard unit, attached to an upper surface of said main body, enabling manual input of information to said computer system while controlling said computer system, said keyboard unit being structurally and operationally separated into respective keyboard halves along a central axis with a left keyboard half and a right keyboard half, said respective keyboard halves independently rotating relative to said axis on first and second pivot points and being coupled to and supported by said main body at a rearward upper surface of said main body; and
   a display unit, mounted via a hinge to a rear surface of said main body, displaying visual images varying in accordance with signals generated by said computer system.

2. The portable computer system as claimed in claim 1, wherein, upon rotation, the left and right keyboard halves may form an angle of symmetry along the central axis of said keyboard unit.

3. The portable computer system of claim 1, further comprised of a support rotatably coupled by said hinge to said display unit said rear surface bearing a socket removably receiving said support while accommodating rotation of said display unit from a closed position with said display unit covering said keyboard unit to an open position with said display unit exposing said keyboard unit to operational use.

4. The portable computer system as claimed in claim 1, where in said keyboard unit further comprises a palm rest.

5. The portable computer system as claimed in claim 4, wherein said palm rest is separated into left and right palm rests, said left and right palm rests being separately and integrally formed with the left and right keyboard halves, respectively.

6. A portable computer system, comprising:
   a main body controlling said portable computer system;
   a keyboard unit, attached to an upper surface of said main body, manually controlling said main body, said keyboard unit being structurally and operationally separated along a central axis into a left keyboard half and a right keyboard half, the left keyboard half and right keyboard half respectively rotating parallel with the upper surface of said main body on a first hinge and a second hinge, the left keyboard half and right keyboard half being coupled to the main body at a rearward upper surface thereof, the left keyboard half forming a maximum predetermined angle with the right keyboard half; and
   a display unit, mounted via a hinge unit to a rear side surface of said main body, displaying images that vary in accordance with a control signal generated by said main body, said display unit being slidably detachable from said main body via a recess formed in the rear side surface of said main body receiving a portion of the hinge unit.

7. The portable computer system as claimed in claim 6, wherein said main body further comprises a main circuit board for controlling said display unit.

8. The portable computer system as claimed in claim 7, wherein said display unit receives an electrical signal from the main circuit board of said display unit via a communicating cable passing through the recess of said main body.

9. The portable computer system as claimed in claim 8, wherein the communicating cable passing through the recess of said main body is of a length which allows said display unit to be situated on a level surface behind said main body.

10. The portable computer system as claimed in claim 6, wherein the hinge unit of said display unit comprises a display support, for insertion into the recess of said main body, which is rotatable about a hinge axis into a rearward position to serve as a base for supporting said display unit on a level surface.

11. The portable computer system as claimed in claim 7, wherein said display unit receives an electrical signal from the main circuit board of said display unit via a wireless method.

12. The portable computer system as claimed in claim 7, wherein said main body comprises a light-emitting device electrically communicating with the main circuit board, and wherein said display unit comprises a light-receiving device for receiving a control signal of the main circuit board via the light-emitting device.

13. A portable computer system comprising:

a main body for controlling said portable computer system;

a keyboard unit, attached to an upper surface of said main body, for controlling said main body, said keyboard unit being structurally and operationally separated along a central axis into a left keyboard half and a right keyboard half, the respective halves rotating on first and second hinges and being coupled to the main body at a rearward upper surface thereof, said first and second hinges disposed on separate pivot points; and a display unit, mounted via a hinge unit to a rear side surface of said main body, for displaying images in accordance with a control signal generated by said main body, said display unit being slidably detachable from said main body via a recess formed in the rear side surface of said main body for receiving a portion of the hinge unit.

14. The portable computer system of claim 1, wherein said display unit being slidably detachable from said main body via a recess formed in the rear side surface of said main body receiving a portion of the hinge unit, said display unit receiving an electrical signal from said main body via a communicating cable passing through the recess of said main body.

15. The portable computer system of claim 1, wherein said main body further comprises:

a main circuit board controlling said display unit; and a communicating cable connecting said main circuit board with said display unit through a recess of said main body, said communicating cable of a length allowing said display unit to slidably detach from said main body, said display unit receiving an electrical signal from said main circuit board via said communicating cable.

16. The portable computer system of claim 1, with the hinge unit of said display unit comprising a display support, removably insertable into the recess of said main body, said support being rotatable about a hinge axis into a rearward position beneath said display unit to serve as a base supporting said display unit on a level surface that may underlie said support.

17. The portable computer system of claim 7, further comprised of, upon rotation, the left and right keyboard halves forming an angle of symmetry along the central axis of said keyboard unit, the angle of symmetry along the central axis of said keyboard unit is determined in accordance with ergonomic design criteria.

18. The portable computer of claim 13, wherein said keyboard unit further comprises a left and right palm rests, the left and right palm rests being integrally formed with the left and right keyboard halves, respectively.

19. The portable computer system of claim 1, further comprised of:

a support rotatably coupled by said hinge to said display unit; and said rear surface bearing a socket removably receiving said support.

20. The portable computer system of claim 1, further comprised of:

said rear surface bearing a socket; and a support rotatably coupled by said hinge to said display unit, said support being removably insertable into said socket while support said display unit during rotation of said display unit between a first orientation covering said keyboard unit and a second orientation exposing said keyboard to operational use, said support being rotatable beneath said hinge and supporting said display unit in an upright and operational position established independently of any location occupied by said main body while said display unit displays said images in accordance with said signals, said support establishing electrical communications between said main body and said display unit.

* * * * *